United States Patent [15] 3,689,598
Bierwirth et al. [45] Sept. 5, 1972

[54] PROCESS FOR THE MANUFACTURE OF FOILS AND SHEETS OF MOLDING COMPOSITIONS OF TACTIC VINYL CHLORIDE HOMO AND/OR COPOLYMERS

[72] Inventors: Egon Bierwirth; Robert Buning, both of Oberlar; Harald Dorffurt, Hangelar; Hans-Ewald Konermann, Oberlar all of Germany

[73] Assignee: Dynumit Nobel AG, Troisdorf, Germany

[22] Filed: Oct. 2, 1969

[21] Appl. No.: 863,314

[30] Foreign Application Priority Data

Oct. 5, 1968 Germany..........P 18 01 400.1

[52] U.S. Cl. ............260/876 R, 260/880, 260/897 C, 260/898, 260/899, 264/176
[51] Int. Cl.............................................C08f 29/24
[58] Field of Search..............................260/876, 899

[56] References Cited

UNITED STATES PATENTS

| | | | |
|---|---|---|---|
| 3,373,229 | 3/1968 | Philpot | 260/899 |
| 2,943,074 | 6/1960 | Feuer | 260/876 |
| 2,802,809 | 8/1957 | Hayes | 260/876 |
| 3,445,416 | 5/1969 | Condo | 260/876 |

FOREIGN PATENTS OR APPLICATIONS 1,438,017   3/1966   France

Primary Examiner—Samuel N. Blech
Attorney—Burgess, Dinklage & Sprung

[57] ABSTRACT

Molding composition containing tactic vinyl chloride homo or copolymer and 5 to 25 weight percent of at least one member selected from the group consisting of a binary copolymer of methyl methacrylate and 1 to 20 weight percent of another methacrylate or 1 to 10 weight percent of an acrylate each having an alcoholic moiety of two to 10, preferably two to four, carbon atoms; a graft copolymer of methyl methacrylate, butadiene and styrene; and a graft copolymer of acrylonitrile, butadiene and styrene. This molding composition has improved physical properties as compared to tactic vinyl chloride polymers alone.

9 Claims, No Drawings

PROCESS FOR THE MANUFACTURE OF FOILS AND SHEETS OF MOLDING COMPOSITIONS OF TACTIC VINYL CHLORIDE HOMO AND/OR COPOLYMERS

It is in the prior art to manufacture film, foils or sheets of atactic, plasticizer-free vinyl chloride polymer molding compositions using calendering or extrusion methods. The term atactic polyvinyl chloride in this case refers to a vinyl chloride polymer which has been made by polymerization, preferably at 50° C., with peroxides and exhibits substantially no steric arrangement of the chlorine atoms thereof. The opposite of this is tactic polyvinyl chloride, which is made by special polymerization processes, such as those described in British Pat. No. 855,213, German Auslegeschrift No. 1,111,826 and French Pat. Nos. 1,230,844, 1,259,267 and especially 1,438,017, is characterized in that it exhibits a particular given steric order (tacticity) of the chlorine atoms. The difficulties that are to be expected in the working of a tactic polyvinyl chloride are described by O. C. Bockmann in British Plastics, June 1965, page 364-365, in his article "Stereoregular Crystalline PVC." The reason for the difficulties in working this material in comparison to working atactic polyvinyl chloride is the higher melting temperature of this material, which is 20° to 30°C. higher than the melting range of another wise similar atactic polyvinyl chloride, depending on the degree of regularity (tacticity) of the arrangement of the chlorine atoms. The correlatively higher working temperatures necessary for formation result in a relatively high decomposition ratio of tactic polyvinyl chloride upon molding since the difference between the thermostabilities of tactic and atactic polyvinyl chloride is not sufficiently great to take care of this required increased temperature.

Since increasing efforts are being made to reduce the working temperatures required for the working of atactic polyvinyl chloride, as for example by the preparation of suitable copolymers, etc., it becomes all the more necessary to accomplish the same thing for the working of tactic polyvinyl chloride. In most cases, however, better workability can be achieved only at a loss of other characteristics, such as lowering of the Vicat temperature, which represents an index of thermal stability of shape (H. Houwink, "Chemie and Technologie der Kunststoffe", Vol. 1, 3rd ed. (1954), p. 652). Attempts to use butadiene copolymers or chlorinated polyethylenes as working adjuvants and elasticizing agents have proven unsuccessful, as it appears from German Auslegeschrift No. 1,208,882, because not only does this make the tactic polyvinyl chloride more brittle, but it also produces an undesired lowering of the Vicat temperature. In order to maintain the high Vicat temperature of tactic polyvinyl chloride, the last above mentioned German Auslegeschrift suggests the admixture of postchlorinated polyvinyl chloride with tactic polyvinyl chloride. Mixtures containing post chlorinated polyvinyl chloride, however, in spite of having physiologically acceptable stabilization, have the disadvantage of unsatisfactory thermostability. Materials of this sort therefore often decompose when they are being rolled out on a calender. Another disadvantage of such material is its poor ductility in the warm state. This disadvantage is most notable in the deep drawing of film or sheeting made of tactic polyvinyl chloride according to methods known hitherto.

Surprisingly, it has now been found that all of the above-mentioned disadvantages, such as poor elasticity, poor workability due to premature decomposition, embrittlement, lowering of the Vicat temperature, and poor deep drawing qualities of film and sheeting can be avoided by utilizing as molding compositions a mixture of tactic vinyl chloride polymers and up to 25 weight percent of a. A binary copolymer of (1) methyl methacrylate and (2) 1–20 weight percent of at least one other methacrylic acid ester or 1–10 weight percent acrylic acid ester which esters have alcohol components containing two to 10 carbon atoms, preferably two to four carbon atoms in straight or branched chain configuration and/or b. A graft copolymerizate of methyl methacrylate/butadiene/styrene and/or c. A graft copolymerizate of acrylonitrile/butadiene/styrene.

If the (a) copolymer is used above, it should constitute about 1–25 weight percent of the entire mixture. If the (b) or (c) copolymers are used it should constitute about 5 to 25 weight percent of the entire mixture. If combinations of (a), (b) and (c) or any two of them are used the collective proportions should be about 1 to 25 weight percent of the entire mixture.

It is desirable to use a tactic vinyl chloride polymer or copolymer which has been polymerized or copolymerized in the known manner at conversions of greater than 30 percent known catalysts at temperatures between 0°C. and −60°C., preferably between −5° C. and −20°C., under shearing conditions such as for example in cylindrical vessels containing rotating grinding bodies or in vessels having agitators with a shearing action (cf. French Pat. No. 1,438,017).

Tactic copolymers of the vinyl chloride usually have as comonomers: 1,2-trans-dichloroethylene, trichloroethylene, tetrachloroethylene, vinylacetate, vinylpropionate, vinylethers, acrylonitrile, acrylic acid esters or methacrylic acid esters, ethylene and/or propylene. The comonomers usually constitute about 0.5 to 10 weight percent of the copolymer.

In the manufacture of molding compositions it is expeditious to mix the components at 175°–185°C. on a heated kneading (masticating) unit, such as a two-roll mill or an extruder; plasticize the molding compositions; and roll these compositions, via a calendar into film or sheeting. In the alternative, the molding compositions may be extruded into films or sheets through a slot die extruder using as the maximum temperature of the molding compositions in the slot die 195° to 205°C.

The following compositions are especially suitable for use in admixture with tactic vinyl chloride polymers to produce the improved molding compositions of this invention:

1. Polymerizates which were produced by copolymerizing methyl methacrylate with at least one other methacrylate, the alcohol components of which contain two to 10, preferably two to four, carbon atoms, whereby 99–80 weight percent of methyl methacrylate and 1–20 weight percent of the $C_2$–$C_{10}$-ester, preferably $C_2$–$C_4$-ester, of the methacrylic acid are present in the final copolymer.

2. Polymerizates which were produced by copolymerizing methyl methacrylate with esters of the acrylic acid, the alcohol components of which contain two to 10, preferably two to four, C-atoms, and which acrylates constitute 1–10 weight percent of the final copolymer.

The manufacture of the polymerizates mentioned under (1) and (2) can be carried out for instance, in accordance with "Houben-Weyl Methoden der org. Chemie", Vol XIV/1, "Makro-molekulare Stoff" page 1,046.

3. Graft copolymerizates of acrylonitrile and styrene on butadiene polymer. The polymer back bone may be copolymerizates of acrylonitrile/styrene and/or butadiene/acrylonitrile or mixtures of all these. The produce contains copolymerized butadiene in a proportion of 5–10 weight percent acrylonitrile in a proportion of 15–35 weight percent and styrene in a proportion of 45–80 weight percent.

The manufacture of these graft copolymerizates can be carried out, for instance, in accordance with the following literature: Belgian Pat. Nos. 651,066, 665,901, 671,228 and 671,229. British Pat. Nos. 1,001,437, French Pat. No. 1,430,214, Houben-Weyl, "Methoden der org. Chemie," Vol. XIV/1, "Makromolekulare Stoffe," pp. 396–400.

4. Graft copolymerizates of methyl methacrylate and styrene on butadiene-polymer. The polymer back bone may be copolymerizates of methacrylic acid ester/styrene and/or butadiene/methacrylic acid ester or mixtures of all these. The product contains copolymerized butadiene in an amount of 5–30 weight percent methyl methacrylate in an amount of 35–60 weight percent and styrene in an amount of 10–40 weight percent.

The manufacture of these graft copolymerizates can, for instance, be carried out in accordance with the following patents:

Belgian Pat. Nos. 671,228 and 671,229
British Pat Nos. 963,372 and 1,001,437

The compositions set forth under 1–4 above are each combined with tactic polyvinylchloride in a suitable manner. Known stabilizers for the manufacture of PVC-molding compositions, lubricants and/or fillers etc., may be added for their usual intended purpose in their normal amounts, for example for improving the workability of the tactic polyvinyl chloride.

The molding material is then preplastified at 175°–185°C. on a two-roll mill or another heated kneading means, such as an extruder and rolled (extruded) as a hot mass:

a. to a calender and rolled to a film at the calender roll temperatures listed in Table 1, or b. after plastification in an extruder, they are driven through a slot or circular die extruder, at a temperature ranging between 195° and 205°C to form film or sheeting.

The compositions of this invention are molded in the temperature range that is generally known for the molding or forming of atactic polyvinyl chloride. If, however, a molding composition based on tactic polyvinyl chloride alone is molded or formed in this temperature range without the additives according to this invention, the film or sheeting thus made show diminished strength characteristics due to insufficient plastification. This diminished strength manifests itself, for example, in frequent cracking of these films or sheets at the lateral margins thereof under the tension applied in pulling them from the calender. On the other hand, if higher working temperatures are used, the same molding composition decomposes, so that a technically usable product is not obtained in this way, either.

The molding compositions according to the invention, based on tactic polyvinyl chloride can nevertheless be worked like ordinary molding compositions based on atactic polyvinyl chloride. The films or sheets manufactured from the molding compositions according to the invention display not only the generally known desirable properties of a polyvinyl chloride film form material but also a thermal stability of shape (Vicat temperature) that is 12° to 15°C. higher. The films or sheeting prepared from the molding composition of the invention can furthermore be deep drawn in an outstanding manner with the application of heat.

The drawn articles thus obtained can be used for the packaging of products as hot as 85°C. such as those encountered in pasteurizing processes in the food industry. Containers made from atactic polyvinyl chloride, such as deep drawn drinking cups, cannot withstand temperatures beyond 70° to 72°C. under the same conditions.

The following examples are given by way of illustration of this invention without being limiting thereon.

EXAMPLE 1

10.0 Kg. of tactic polyvinyl chloride containing 68 percent of syndiotactically arranged chlorine atoms, which is either used as a:

a. homopolymer; or
b. copolymer with 5 weight per cent of 1,2-trans-dichloroethylene whereby the K value amounts to 62 in each case. The tacticity was determined in accordance with the following literature: H. Germar, K. H. Hellwege, U. Johnsen, "Makromolekulare Chemie," Vol. 60 (1963), pp. 106–119. 0.2 Kg. of stabilizer composed of 75 weight percent of a di-n-octyl-tin-sulphur-compound and 25 weight percent epoxidized soybean oil, commercial name "Advastab 17 MO" of the firm Deutsche Advance GmbH and 0.1 Kg of a montanic acid ester such as OP-Wach (Commercial name of Farbwerke Hoechst) as lubricant, are mixed together for 10 minutes at 20°C. in a fluid mixer. The compound is plastified for 6 minutes at 212°C. on a two-roll mill, and then the hot mass is roll molded into a film on a four-roll calender at the following temperatures: first roll 212,C., second roll 215°C., third roll 218,C., fourth roll 222°C., measured in the direction of movement of the film.

EXAMPLE 2

The mixture described in Example 1, using a tactic vinyl chloride copolymer formed with 5 weight percent of trans-dichloroethylene is mixed as described in Example 1 with the addition of 0.4 kg of a copolymer of 85 weight percent of methyl methacrylate and 15 weight percent of butyl methacrylate and is worked into a film at the temperature stated in Table 1.

EXAMPLE 3

The mixture described in Example 1, using a tactic vinyl chloride copolymer formed with 5 weight percent of transdichloroethylene and with the addition of 0.4 kg of a copolymer consisting of 95 weight percent of methyl methacrylate and 5 weight percent of ethyl acrylate is worked into a film at the temperatures stated in Table 1.

EXAMPLE 4

The mixture described in Example 1, using a tactic vinyl chloride-copolymer formed with 5 weight percent of transdichloroethylene and with the addition of 0.8 kg of a graft copolymer of methyl methacrylate/butadiene/styrene with a grafted methyl methacrylate portion of 49 weight per cent and a styrene-portion of 22 weight percent (the commercial product "Paroloid KM 228" of the firm Rohm & Haas, Philadelphia, U.S.A. can also be used), is mixed analogous to Example 1 and is worked into a film at the temperature stated in Table 1.

EXAMPLE 5

The mixture described in Example 1, using a tactic vinyl chloride-copolymer with 5 weight percent of trans-dichloroethylene with the addition of 0.8 kg of a graft copolymer of acrylonitrile/butadiene/styrene with an acrylonitrile content of 24 weight percent and a styrene content of 61 weight percent is plastified under the conditions stated in Table 1 and rolled into a film.

EXAMPLE 6

The mixture described in Example 1 using a tactic vinyl homopolymer and with the addition of 0.4 kg of a copolymer consisting of 95 weight percent of methyl methacrylate and 5 weight percent of ethyl acrylate is worked into a film under the conditions stated in Table 1.

EXAMPLE 7

The mixture described in Example 1, using a tactic vinyl chloride-copolymer with 5 weight percent of trans-dichloroethylene and with the addition of 0.3 kg of a copolymer consisting of 95 weight percent of methyl methacrylate and 5 weight percent of ethyl acrylate and 0.4 kg of an acrylonitrile/butadiene/styrene-graft copolymer according to Example 5 is worked into films under the conditions stated in Table 1.

EXAMPLE 8

The mixture described in Example 2 is preplastified in an extruder which is equipped with a slot die and with a core progressive one-zone screw (compression ratio 1 : 2), at a temperature of about 180° and 190°C., and the plastic mass is then slot die extruded at a temperature ranging from 195° to 205°C. to form a film or sheet.

In the following Table I, the working conditions are given for the molding compositions set forth in the Examples: some of the characteristics of the films or sheets prepared therefrom are described.

TABLE I

| Molding composition according to example No. | Tactic material with 68% syndiotactic chlorine atoms | Additive per 100 parts of tactic material | Plastification °C. | Calendar roll temperature, rolls 1-4, °C. | Judgement of workability | Vicat temp., °C., in accordance with DIN 53460 hot water, °C. | Stability of shape of deep drawn drinking cups against hot water, °C. | Yield strength lengthwise, crosswise in kp./cm.² DIN 53455 | Elongation lengthwise, crosswise in percent, DIN 53455 |
|---|---|---|---|---|---|---|---|---|---|
| 1 | Copolymer with 5% trans-dichloroethylene K value 62. | | 212 | 212 215 218 222 | Poor, molding composition decomposes and sticks. | 90 | 84 | 605 590 | 60 45 |
| 2 | As in Ex. 1 | 4 parts of copolymer consisting of 85% of methyl methacrylate and of 15% of butyl methacrylate. | 183 | 185 190 195 200 | Very good | 90 | 84 | 600 580 | 55 40 |
| 3 | As in Ex. 1 | 4 parts of copolymer consisting of 95% of methyl methacrylate and of 5% of ethyl acrylate. | 183 | 185 190 195 200 | do | 90 | 84 | 610 590 | 50 40 |
| 4 | As in Ex. 1 | 8 parts of methyl methacrylate/butadiene/styrene-graft copolymer. | 184 | 186 192 198 203 | Good | 90 | 84 | 590 570 | 70 55 |
| 5 | As in Ex. 1 | 8 parts of acrylonitrile/butadiene/styrene-graft copolymer. | 184 | 186 192 198 203 | do | 90 | 84 | 590 580 | 65 55 |
| 6 | Homopolymer K value 62 | 4 parts of copolymer as in example 3 | 182 | 185 190 195 200 | Very good | 91 | 84 | 605 585 | 60 50 |
| 7 | As in Ex. 1 | 3 parts of additive polymer as in example 3, 4 parts of graft copolymer as in example 5. | 182 | 185 190 195 200 | do | 90 | 84 | 595 575 | 75 60 |

*) Explanations with reference to table:

Drinking cups were prepared by deep drawing of films (0.4 mm thickness) made of the various tactic polyvinyl chloride compositions having the following dimensions: Diameter at brim 7 cm, diameter at bottom 5 cm, height 7 cm. These cups were supported by a ring clamp at the top edge and thus, with the bottom suspended in the air, filled with hot water at different temperatures. The maximum temperature at which no bulging of the bottom occurred was noted.

By the calender process, films can be made in thicknesses of 0.08–0.6 mm, and using a slot die extrusion process films can be made having thicknesses of 0.6 to 1 mm, and sheets having thicknesses up to, for example 10 mm.

What is claimed is:

1. A polyvinyl chloride composition suitable for use as a film or sheet forming molding material comprising tactic vinyl chloride polymer prepared by catalytic polymerization at 0° to 60°C in a rotating polymerization zone under shearing conditions at conversions of more than 30 percent and an effective amount up to about 25 weight percent of at least one additive selected from the group consisting of:
   a. a binary copolymer of methyl methacrylate and a different ester selected from the group consisting of 1 to 20 weight percent of a methacrylate or 1 to 10 weight percent of an acrylate, wherein the alcoholic moiety of said different ester contains about two to 10 carbon atoms;
   b. a graft copolymer of 35 to 60 weight percent methyl methacrylate/5 to 30 weight percent butadiene/10 to 40 weight percent styrene; and
   c. a graft copolymer of 15 to 30 weight percent acrylonitrile/5 to 10 weight percent butadiene/45 to 80 weight percent styrene.

2. A composition as claimed in claim 1 wherein said alcoholic moiety has two to four carbon atoms.

3. A film of the compositions claimed in claim 1.

4. A composition as claimed in claim 1 having 1 to 25 weight percent of additive a).

5. A composition as claimed in claim 1 having 5 to 25 weight percent of the additive (b) and/or (c).

6. A composition as claimed in claim 1 wherein said tactic vinyl chloride polymer is a homopolymer.

7. A composition as claimed in claim 1 wherein said tactic vinyl chloride polymer is a copolymer with at least one comonomer selected from the group consisting of 1,2-trans-dichloroethylene, trichloroethylene, tetrachloro ethylene, vinyl acetate, vinyl propionate, a vinyl ether, acrylonitrile, an acrylate, a methacrylate, ethylene and propylene.

8. A composition as claimed in claim 7 wherein said comonomer is present in a proportion of about 0.5 to 10 weight percent of said vinyl chloride polymer.

9. A composition as claimed in claim 1 wherein said tactic vinyl chloride polymer has a syndiotacticity of the chlorine thereof of about 68 percent.

* * * * *